US007390986B2

(12) United States Patent
McDonald

(10) Patent No.: US 7,390,986 B2
(45) Date of Patent: Jun. 24, 2008

(54) SYSTEM AND METHOD FOR DYNAMICALLY ADJUSTING THE ALLOCATION OF MAIL ITEMS ASSOCIATED WITH PARTICULAR DELIVERY POINTS WITHIN A CARRIER STRUCTURE

(75) Inventor: Glenn McDonald, Alexandria, VA (US)

(73) Assignee: United States Postal Service, Washington, DC (US)

(*) Notice: Subject to any disclaimer, the term of this patent is extended or adjusted under 35 U.S.C. 154(b) by 361 days.

(21) Appl. No.: 10/865,913

(22) Filed: Jun. 14, 2004

(65) Prior Publication Data

US 2004/0251180 A1 Dec. 16, 2004

Related U.S. Application Data

(60) Provisional application No. 60/478,123, filed on Jun. 12, 2003.

(51) Int. Cl.
*B07C 5/00* (2006.01)
*G06K 9/00* (2006.01)

(52) U.S. Cl. ........................................ 209/584; 209/900

(58) Field of Classification Search ................. 209/584, 209/900; 270/52.03; 271/176
See application file for complete search history.

(56) References Cited

U.S. PATENT DOCUMENTS 3,871,643 A * 3/1975 Kukucka et al. ............ 271/290
4,507,739 A * 3/1985 Haruki et al. ............... 700/224
5,328,169 A * 7/1994 Mandel ....................... 271/290
5,358,238 A * 10/1994 Mandel et al. .............. 271/298
5,480,032 A * 1/1996 Pippin et al. ................ 209/583
5,547,178 A * 8/1996 Costello .................. 270/52.02
5,551,686 A * 9/1996 Sanchez et al. ............. 271/298
5,777,882 A * 7/1998 Salgado ...................... 700/214
6,079,570 A * 6/2000 Oppliger et al. ............. 209/630
6,107,589 A * 8/2000 Yamashita et al. .......... 209/584
6,279,750 B1 * 8/2001 Lohmann .................... 209/559
6,283,304 B1 * 9/2001 Gottlieb et al. ............. 209/603
6,749,194 B2 * 6/2004 Hanson et al. .............. 271/176
2003/0055795 A1 * 3/2003 Sesek ......................... 705/410
2004/0035762 A1 * 2/2004 Brown ........................ 209/584

OTHER PUBLICATIONS

PCT International Search Report for International Application No. PCT/US04/18853 dated Apr. 10, 2007 (10 pages).

* cited by examiner

*Primary Examiner*—Patrick Mackey
*Assistant Examiner*—Mark Hageman
(74) *Attorney, Agent, or Firm*—Finnegan, Henderson, Farabow, Garrett & Dunner LLP

(57) ABSTRACT

System and method for dynamically adjusting cells in a carrier structure for receiving mail items for delivery through a postal delivery service. Delivery points, which may represent a post office address, correspond to cells in the carrier structure. The allocation of cells may be adjusted based upon the mail delivery demands of the delivery point. Delivery points, and their corresponding cells, may also be added and/or deleted.

20 Claims, 3 Drawing Sheets

SYSTEM AND METHOD FOR DYNAMICALLY ADJUSTING THE ALLOCATION OF MAIL ITEMS ASSOCIATED WITH PARTICULAR DELIVERY POINTS WITHIN A CARRIER STRUCTURE

RELATED APPLICATION

This application relates to and claims the priority of U.S. Provisional Application No. 60/478,123 filed on Jun. 12, 2003, in the name of Glenn MACDONALD, the disclosure of which is incorporated herein in its entirety.

DESCRIPTION

1. Technical Field

This invention relates generally to organization of mail items for delivery through a postal delivery service and more particularly to dynamically adjusting the size of the cells in a device for receiving mail items.

2. Background

Currently, postal delivery services, for example the United States Postal Service (USPS), deliver mail items to delivery points. Delivery points may be discrete delivery locations, such as a street address or a type of post office box issued by the postal service to a subscriber. Each discrete delivery point may be further represented by an eleven (11) digit numerical code.

As the postal service receives mail items for deliver, the mail items may commence a sorting process. A purpose of the sorting process may be to organize the mail items by an intended delivery point so that mail carriers may deliver the mail items. Mail carriers may have a carrier route having one or more delivery points and a route sequence for delivering mail items to the delivery points. A route sequence may include a carrier's movement from one delivery point to another delivery point for the purpose of delivering mail items to customers. A mail carrier for a particular route may be responsible for delivering the mail items intended for those delivery points within the particular route.

Further, at the end of the sorting process, mail items may be organized within a multi-cell carrier case having individual cells for receiving the mail items. Each individual cell within the carrier case may correspond to a single delivery point and have an allocated space to receive mail items. The mail carriers may be responsible for delivering mail items within the individual cells corresponding to the mail carrier's route.

Carrier cases having individual cells may have to be manually adjusted to accommodate mail items if the allocated space is inadequate to receive all the mail items for a particular delivery point. In addition, carrier routes are dynamic (i.e., delivery points may need to be added or deleted). This may lead to an additional requirement of space in a cell and additional cells in the carrier case, if the number of delivery points grows within a delivery route.

For example, mail items may be further classified as letters and flats. A small business may start with a one (1) inch wide cell allocation for letters and a one (1) inch allocation for flats, thereby having a combined two (2) inch requirement for mail items. Over time, the business may expand, thereby increasing its need for delivery of mail items. Thus, its combined two (2) inch wide may need to increase to three (3) or more inches.

Thus, it is desirable to dynamically adjust the allocation of space for mail items within a carrier case structure to respond to the addition and deletion of delivery points, as well as the growth and contraction of individual delivery points, while maintaining a mail carrier's existing delivery route and route sequence.

SUMMARY OF THE INVENTION

In accordance with the invention, a method for adjusting the allocation of space within cells of a carrier structure. The cells receive mail items for delivery and are arranged according to a route sequence. The method comprises assigning at least one cell to a first delivery point. The first delivery point corresponds to a delivery location in the route sequence. The method further comprises determining a thickness of a mail item to be sorted with the first delivery point; comparing the thickness with a remaining space for the assigned cell and sorting the mail item with the assigned cell if the thickness is less than the remaining space and diverting the mail piece to an overflow cell if the thickness is greater than the remaining space; and assigning adjacent cells to the at least one assigned cell to the first delivery point address based upon a number of occurrences of overflow of the first delivery point. The step of assigning adjacent cells includes shifting positions of cells associated with other delivery points located at delivery locations subsequent to the first delivery point on the route sequence.

There is further provided a method for adding cells within a carrier structure. The cells receive mail items for delivery and are arranged according to a route sequence. The method comprises adding a first delivery point to the route sequence. The delivery point corresponds to a first delivery location. The method further comprises adding at least one cell to the carrier structure corresponding to the first delivery point. The at least one cell is added in a position corresponding to the first delivery location. Also, the method comprises adjusting adjacent cells to the at least one added cell by shifting positions of the adjacent cells to maintain an order of the route sequence.

There is further provided, a system for dynamically adjusting space allocation for mail items. The system comprises a carrier structure, having cells. Each cell corresponds to and is arranged by a delivery point along a route sequence. The system further comprises an allocation software program for creating a virtual carrier corresponding to the carrier structure, including virtual cells corresponding to the cells of the carrier structure. The allocation software program determines whether a remaining space in a cell is adequate to receive mail items associated with the corresponding delivery point, adjusts the space allocation of the delivery point according to a number of occurrences of overflow, and adjusts the virtual cells associated with the delivery point to receive the overflow. The carrier structure and cells are adjusted according to the virtual carrier and virtual cells while maintaining the route sequence.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE EMBODIMENTS

Figure 1:
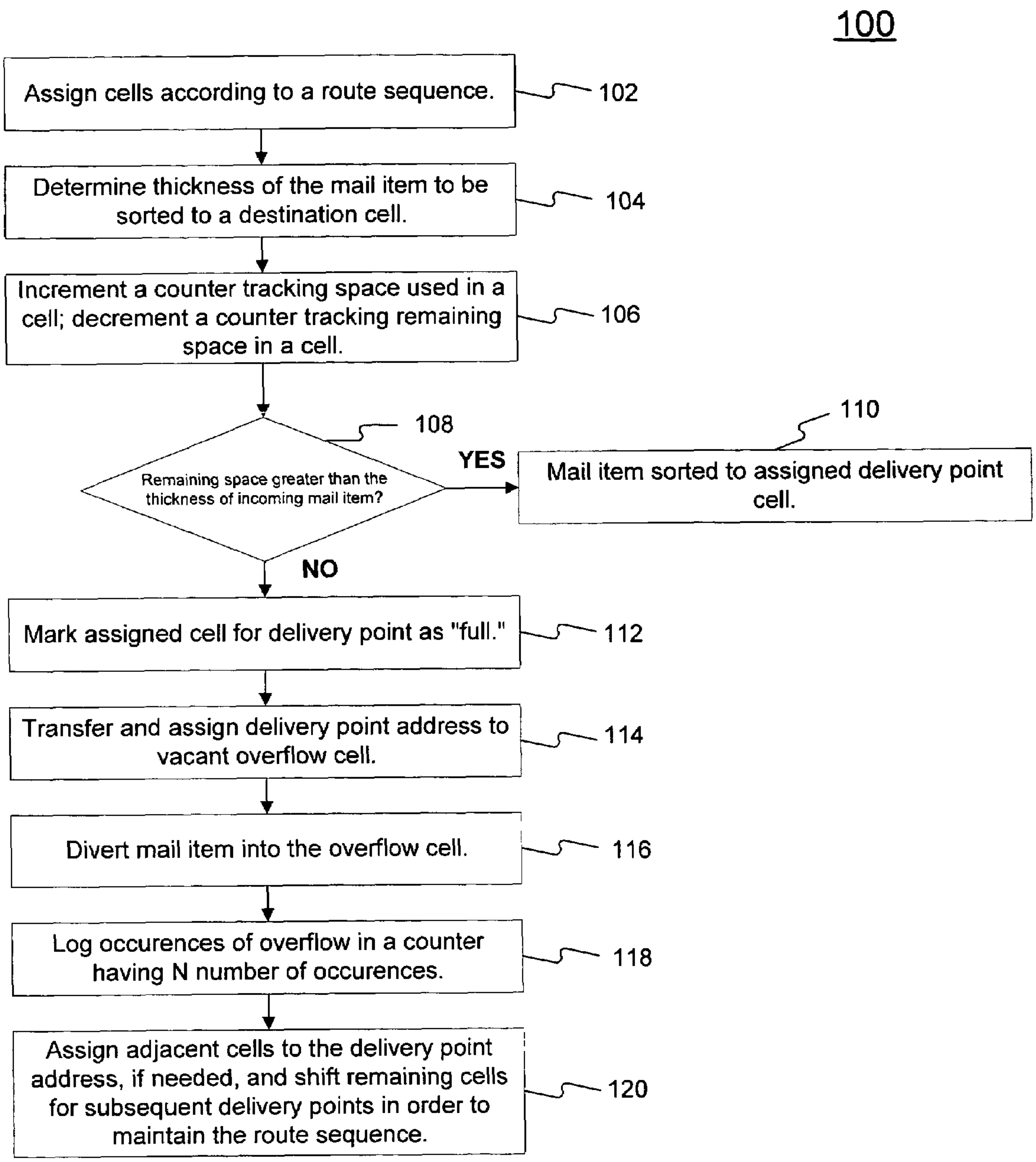
FIG. 1 is a flowchart for a method consistent with the invention for dynamically adjusting individual cells within a carrier structure for receiving mail items.

Referring now to the drawings, FIG. 1 is a flowchart for a method 100 for dynamically adjusting cells within a carrier structure.

Delivery points may be defined in a system that manages each address associated with each delivery point. For example, USPS uses an address management system (AMS) which defines each address for every delivery point in every delivery unit in the USPS. AMS may further control a national directory support system (NDSS), which may create weekly loadable directories and refresh tapes for delivery point sorters (DPS) and customer service bar code sorters (CSBCS).

For example, each delivery unit whose mail is processed by delivery point sorters (DPS) may maintain its own NDSS directory information in a local directory which may be loaded into the DPS sort program on a daily basis. Daily transactions can be made to the local directory to, for example, add new delivery points, delete existing delivery points, and alter delivery instructions. Delivery instructions may be altered, for example, when a customer moves and submits a mail forwarding request, or when a customer goes on vacation and desires that his mail be held at the post office until he returns from vacation.

The local post office DPS loadable directory may be updated by a daily edit process which modifies the DPS sort plan, but which is not passed up to the NDSS. The loadable directory may be directly loaded into mail sorting equipment to update the sort programs each day. Once a week, on a predetermined schedule, the local directory may be uploaded to the national NDSS system, where it may be incorporated into NDSS. When all of the scheduled updates have been received, NDSS may create and download the weekly refresh tapes that contain the new weekly DPS sort programs to each postal facility that does DPS letter sorting.

Every week, the NDSS may automatically generate and download the sort programs for each post office for which mail may be sorted to letter carriers by electronic letter sorting equipment. The weekly downloads may "refresh" the existing sort programs that were used during the previous week. The process also creates the local zone specific delivery point file, referenced above. This process may involve creating and mailing a magnetic tape containing the sort plan information to the place where the automated sorting equipment was located. The process of transmitting an updated sort program may also be conducted over an in-house wide area network that may directly connect to the piece of automated mail sorting equipment.

The directories and refresh tapes may be used by a Sort Program System (SPS) to automatically update the sort programs that are used by the DPS and CSBCS to sort mail items to carriers for their route sequence. In between the weekly refresh cycles, local delivery unit personnel may make temporary daily changes to the sort programs using an editing utility call the "local input system."

A basic building block of AMS may be a local maintained zone specific delivery point file. Each delivery point may be defined as a 273 byte record. For example, bytes 111-113 may define a cell width required for flat mail in inches and half inches. Bytes 114-116 may define a cell width required for letter mail in inches and half inches. This data may be changed in the local input system and may be automatically uploaded to the AMS database.

Method 100 begins at stage 102, where cells are assigned according to a route sequence. The cells may be assigned to a virtual carrier case using a particular sort program being used on that particular day. Each cell in the virtual carrier case may be assigned a uniquely identifiable reference address. Addresses may be assigned by using letters to describe carrier case rows and numbers to describe particular cells within each row (e.g., cell D14 may reference the $14^{th}$ cell in Row D).

Each individual cell may also be of uniform width and set an angle (e.g., 45 degrees from vertical) to allow mail items to be inserted and stay upright without requiring a compression loading device to maintain an upright position. It is understood that the angle may be any angle that allows the mail to stand upright without shifting. In addition, the cells may be set on a horizontal plane.

Cells may be assigned so the number of cells may adequately receive a total width including the sum of the flat case cell width plus the letter case cell width.

At stage 104, the overflow volume is determined by measuring a thickness of an incoming mail item in a vertical or horizontal plane after the sort program resolves the delivery point virtual case address. The thickness may be determined by using a laser dimensioning system. Measurement may be achieved by referencing the unique delivery point 11-digit barcode results to the virtual cell assigned to the delivery point.

At stage 106, the remaining space in the assigned cell is tracked by incrementing a counter for tracking the space used in a cell and decrementing counter used for tracking the remaining space in a cell. Each delivery point cell in the virtual case may have a fixed width and a unique address.

At stage 108, method 100 determines whether a mail item that is to be sorted into the assigned cell can fit into the remaining space within the assigned cell. If the mail item can, method 100 goes to stage 110, where the mail item is assigned to the cell.

If the mail item cannot fit into the remaining space, method 100 goes to stage 112, where the sort program may mark the assigned cell as "Full."

At stage 114, the sort program transfers and assigns the delivery point address to a vacant unassigned cell in an overflow area. For example, a cell represented as "AB136" may be the overflow cell for D14.

At stage 116, the subsequent mail items to be sorted for the delivery point are diverted to the overflow cell.

At stage 118, the occurrences of overflow may be logged into a counter, wherein N number of occurrences will be represented. In addition, an overflow situation may be logged by zone, date, a carrier route ID, and a delivery point sequence ID. Further, weekly management reports that may describe the N number of occurrences that a delivery point generated overflow volume and a number of additional cells allocated when overflow volume was re-directed to the overflow cells may be produced.

The number N may be an overflow occurrence counter that may be user selectable in sort program. This may allow end users to produce management reports regarding delivery reports that overflow N times in a reporting interval. For example, if the selected period is one (1) week, and the value of N is four (4), the management report would report all delivery points that had generated overflow volume four (4) times in the selected week.

In addition, personnel may set parameters for changing the cell width base upon a desire to minimize overflow volume. For example, the changes may be introduced via the local input system so that information regarding the carrier route and delivery point information may be changed.

At stage 120, when cell widths are changed and require additional cells based upon the overflow volume of the delivery address, the additional cells may be assigned adjacent to the original assigned cell in the virtual carrier case in order to maintain the existing route sequence. The virtual case assignment may shift all subsequent delivery points by a number of positions, corresponding to the number of additional cells being added for the delivery point.

An example of the system in operation may include cells in a system that are fixed at two (2) inches wide (or high, if using horizontal cells). Further, a carrier route may have a delivery point represented by "192130," and a sum of the letter and flat case cell widths may be 1.5 inches. The virtual casing software may assign the delivery point to a hypothetical slot D14. In a case where, volume may increase for a period of days, it may be desirable to increase the cell space allowed for delivery point 192130 by one inch. The overflow volume may be diverted to hypothetical cell AB136.

In addition to referencing the cells as noted above, cells may be identified by other grid reference location schemes. The grid reference location schemes may include grid reference, bar codes, and radio frequency identification (RFID) devices positioned at reference points at the cells.

The local input system may be processed in the weekly sort program generation cycle, and delivery point 192130 is assigned two (2) two (2) inch slots, labeled D14 and D15. Delivery point cell addresses beyond slot D15 may be incremented by one in the software, and the virtual case may be ready for receiving mail items. Subsequent delivery point adjustments to the sort program may be performed sequentially, in ascending order, in order to maintain the route sequence.

As illustrated above, when addressing delivery point growth (e.g., from one cell to two for a particular delivery point), it is desirable to be able to dynamically reallocate contiguous slots in a sort plan in order to accommodate delivery point growth, while maintaining the route sequence.

Figure 2:
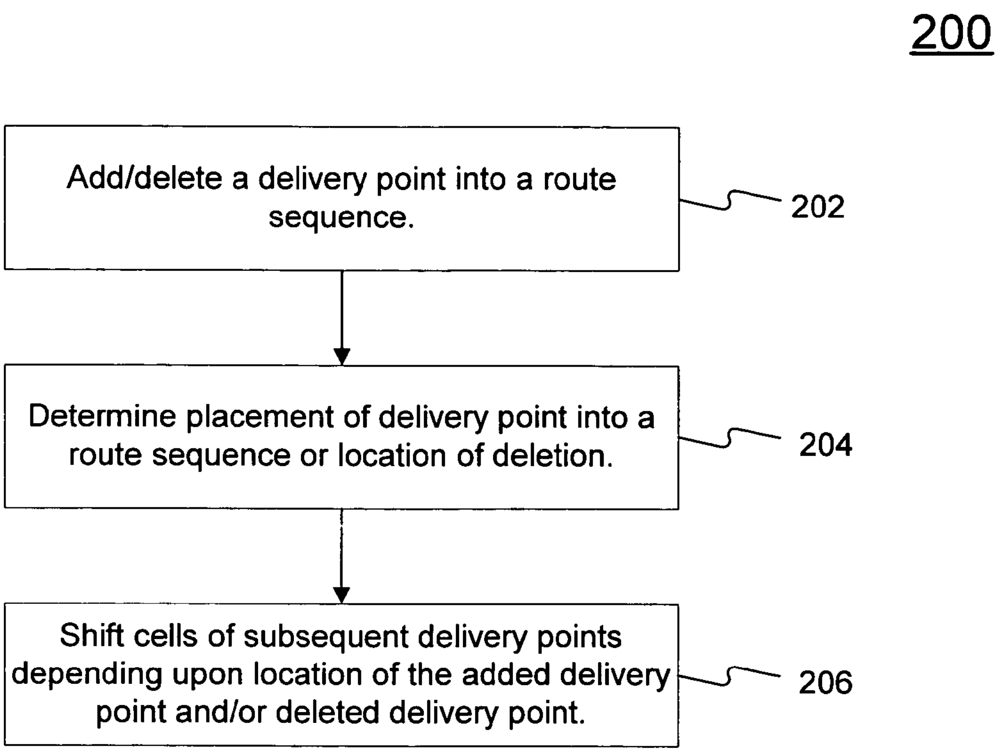
FIG. 2 is a flowchart for a method consistent with the invention for dynamically adjusting a carrier case for the addition or deletion of delivery points.

FIG. 2 illustrates a flowchart for a method 200 for dynamically adjusting a virtual carrier case.

At stage 202, a delivery point may be either added or deleted from an a route sequence. This may represent that a new postal address has been added to the postal delivery route of a carrier, a new building along a postal route, or that an existing delivery point has been removed from the postal route.

At stage 204, the system determines where along the route sequence the added delivery point should be added or the location from which the delivery point should be removed.

At stage 206, the individual cells of subsequent delivery points are shifted by a number of positions corresponding to the number of additions an/or deletions of delivery points so as to maintain the route sequence.

Method 200 may also be described as an example. Two delivery points, 192130 and 192140, may occupy two (2) virtual cells D12 and D13, in a route sequence. It may be desirable to add a delivery point labeled 192135 that has been added to a database (e.g., AMS). Delivery point 192135 may be in a position that is between 192130 and 192140 in the route sequence. Using the local input system at the next day's sort program load, a virtual cell allocation scheme may detect that delivery point 192135 would be assigned to virtual cell D13 and that delivery point 192140 should be assigned to virtual cell D13+1, or D14. Further, all virtual delivery points following D14 would be reallocated to their former virtual locations plus 1.

Also, if, as in the previous example, there are three delivery points in a route sequence, numbered 192130, 192135 and 192140 and delivery point 192135 is eliminated, the system may also contract itself to eliminate existing delivery points when the sort plan is loaded.

Figure 3:
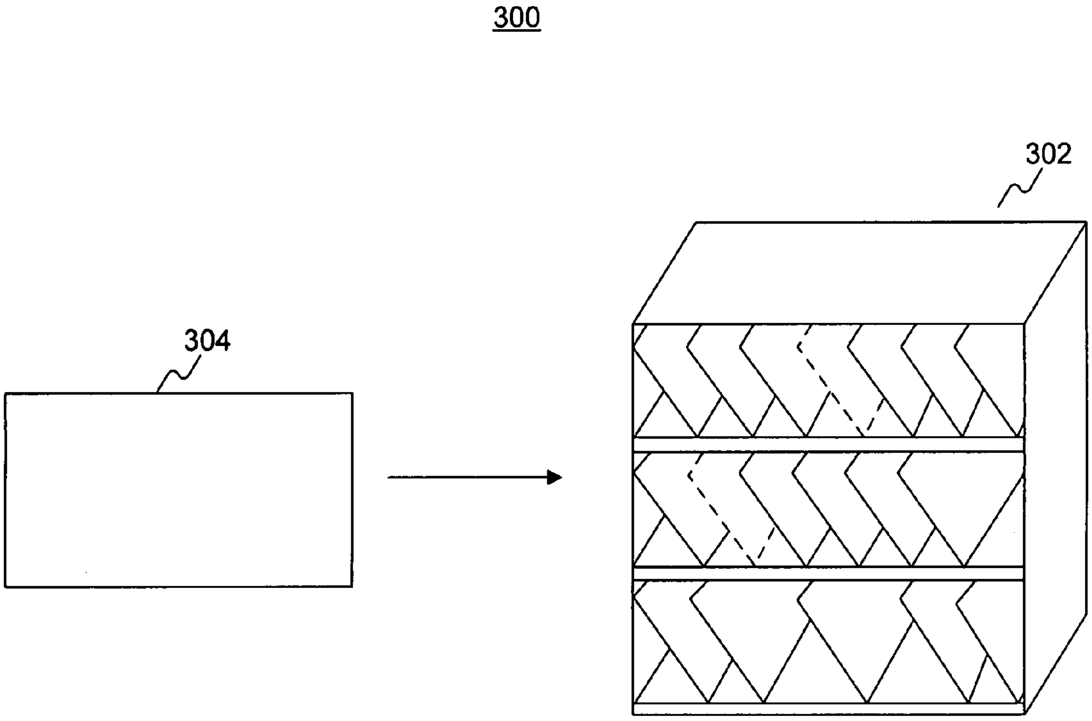
FIG. 3 is a block diagram of system for dynamically adjusting the size of cells in a device consistent with the present invention.

FIG. 3 illustrates a block diagram for system 300 for dynamically adjusting the space allocation of a carrier structure. System 300 includes a carrier structure 302 and allocation software program 304.

Carrier structure 302 has cells and each cell corresponds to and is arranged by a delivery point along a route sequence. Allocation software program 304 creates a virtual carrier corresponding to the carrier structure and includes virtual cells corresponding to the cells of the carrier structure.

As mail items are sorted by delivery point, allocation software program 304 determines whether there is space in a cell by reading in a thickness of the mail item and comparing that figure to the remaining space in the cell. Allocation software program uses the virtual cell and virtual carrier.

After an N number of overflow occurrences are counted, allocation software program 304 adjusts the space allocation of the delivery point according to a number of occurrences of overflow by adjusting the virtual cells associated with the delivery point. Carrier structure 302 and cells contained therein are adjusted according to the virtual carrier and virtual cells while maintaining the route sequence.

Other embodiments of the invention will be apparent to those skilled in the art from consideration of the specification and practice of the invention disclosed herein. It is intended that the specification and examples be considered as exemplary only with a true scope and spirit of the invention being indicated by the following claims.

What is claimed is:

1. A method for adjusting the allocation of space within cells of a carrier structure, wherein the cells receive mail items for delivery and are arranged according to a route sequence, said method comprising:

assigning at least one cell to a first delivery point, wherein the first delivery point corresponds to a delivery location in the route sequence;

determining a thickness of a mail item to be sorted with the first delivery point;

incrementing a first counter tracking space used in the at least one assigned cell;

decrementing a second counter tracking remaining space in the at least one assigned cell;

comparing the thickness with the remaining space in the at least one assigned cell and sorting the mail item to the at least one assigned cell if the thickness is less than the remaining space and diverting the mail item to an overflow cell if the thickness is greater than the remaining space; and assigning a cell adjacent to the at least one assigned cell to the first delivery point based upon a number of occurrences of overflow of the at least one assigned cell;

wherein assigning the cell adjacent to the at least one assigned cell includes shifting positions of cells associated with other delivery points located at delivery locations subsequent to the first delivery point on the route sequence.

2. The method of claim 1, wherein the thickness is determined by using a laser-light based dimension system.

3. The method of claim 1, wherein the cells are uniform in width.

4. The method of claim 1, wherein the cells are arranged in the route sequence by a sort program.

5. The method of claim 1, wherein each cell has a uniquely identifiable reference address.

6. The method of claim 1, further comprising logging the overflow by zone, date, carrier ID, and delivery point sequence.

7. The method of claim 1, further comprising producing periodic management reports that describe the number of occurrences of overflow and a number of cells allocated when overflow was re-directed to overflow cells.

8. The method of claim 1 further comprising:

incrementing an overflow counter when a mail item is diverted to an overflow cell.

9. The method of claim 1 further comprising:

changing the width of the cell.

10. A method for adding cells within a carrier structure, wherein the cells receive items for delivery and are arranged according to a route sequence, said method comprising:

adding a first delivery point to the route sequence, wherein the delivery point corresponds to a first delivery location;

adding at least one cell to the carrier structure corresponding to the first delivery point, wherein the at least one cell is added in a position corresponding to the first delivery location;

assigning a cell width to the at least one cell;

adjusting adjacent cells to the at least one added cell by shifting positions of the adjacent cells to maintain an order of the route sequence;

determining respective thicknesses of the items for delivery;

incrementing a first counter tracking space used in the at least one cell as at least one of the items for delivery is allocated to the at least one cell;

decrementing a second counter tracking remaining space in the at least one cell as the at least one of the items for delivery is allocated to the at least one cell; and adjusting the cell width of the at least one cell when the second counter indicates no space remains in the at least one cell.

11. The method of claim 10, wherein the cells are arranged in the route sequence by a sort program.

12. The method of claim 10, wherein each cell has a uniquely identifiable reference address.

13. The method of claim 10, wherein the cells are arranged on an angle from the vertical axis.

14. The method of claim 13, wherein the angle is approximately 45 degrees.

15. A system for dynamically adjusting space allocation for delivery items, comprising:

a dimensioning system for measuring respective thicknesses of delivery items;

a carrier structure, having cells designed to receive delivery items, wherein each cell corresponds to and is arranged by a delivery point along a route sequence; and an allocation software program for creating a virtual carrier corresponding to the carrier structure, including virtual cells corresponding to the cells of the carrier structure, wherein the allocation software program:

tracks available space in a cell using the measured thicknesses of delivery items, the tracking comprising:

incrementing a first counter tracking space used in one of the virtual cells; and decrementing a second counter tracking remaining space in the virtual cell;

determines whether a remaining space in a virtual cell is adequate to receive delivery items associated with the corresponding delivery point by comparing the remaining space to the measured thicknesses of delivery items associated with the corresponding delivery point;

adjusts the space allocation of the delivery point according to a number of occurrences of overflow; and adjusts the virtual cells associated with the delivery point to receive the overflow; and wherein the carrier structure and cells are adjusted according to the virtual carrier and virtual cells while maintaining the route sequence.

16. The system of claim 15, wherein the cells are uniform in width.

17. The system of claim 15, wherein the cells are arranged in the route sequence by a sort program.

18. The system of claim 15, wherein each cell has a uniquely identifiable reference address.

19. The system of claim 15, wherein the cells are arranged on an angle from the vertical axis.

20. The system of claim 19, wherein the angle is approximately 45 degrees.

* * * * *